United States Patent
Kelyman

(10) Patent No.: US 10,422,076 B1
(45) Date of Patent: Sep. 24, 2019

(54) PNEUMATIC CORE CLEANING SYSTEM

(71) Applicant: Brunn Air Systems, Inc., Memphis, TN (US)

(72) Inventor: John Kelyman, Germantown, TN (US)

(73) Assignee: Brunn Air Systems, Inc., Memphis, TN (US)

( * ) Notice: Subject to any disclaimer, the term of this patent is extended or adjusted under 35 U.S.C. 154(b) by 0 days.

(21) Appl. No.: 16/411,403

(22) Filed: May 14, 2019

Related U.S. Application Data

(60) Provisional application No. 62/673,813, filed on May 18, 2018.

(51) Int. Cl.
  *D21B 1/34* (2006.01)
  *D21C 5/02* (2006.01)
  *D21B 1/32* (2006.01)

(52) U.S. Cl.
  CPC ............ *D21B 1/347* (2013.01); *D21B 1/32* (2013.01); *D21C 5/02* (2013.01)

(58) Field of Classification Search
  CPC .. D21C 5/02; D21B 1/347; D21B 1/32; D21F 7/00; B08B 15/002; B08B 5/026; B08B 5/046; A47L 5/14; B65H 18/145; B65H 18/20; B65H 2406/30; B65H 2408/215; B65H 35/0006
  See application file for complete search history.

(56) References Cited

U.S. PATENT DOCUMENTS

| | | | | |
|---|---|---|---|---|
| 3,377,033 A | * | 4/1968 | Link | B65H 18/145 |
| | | | | 242/534.2 |
| 3,807,612 A | * | 4/1974 | Eggert | B65H 20/04 |
| | | | | 226/42 |
| 3,901,809 A | | 8/1975 | Ball et al. | |
| 4,094,472 A | | 6/1978 | Berndt et al. | |
| 4,209,362 A | * | 6/1980 | Salmela | D21B 1/32 |
| | | | | 162/191 |
| 4,867,383 A | | 9/1989 | Terry et al. | |

(Continued)

OTHER PUBLICATIONS

Mushiri, T., Mbohwa, C., & Mashana, G. (Sep. 2016). "Design of a paper slitting and rewinding machine for a developing country, Zimbabwe." Proceedings of the 2016 International Conference on Industrial Engineering and Operations Management, Detroit, Michigan, USA, 11 pages.

(Continued)

*Primary Examiner* — Jose A Fortuna
(74) *Attorney, Agent, or Firm* — United IP Counselors, LLC

(57) ABSTRACT

A powered pneumatic system for capturing a rejected tissue sheet on a parent roll for recycling. The parent roll is supported on a powered parent roll back stand, which turns the parent roll to unwind it. The sheet is drawn into the inlet of a wide pneumatic hood. Suction pressure supplied by a material-handling fan draws the sheet through a duct, where the material-handling fan breaks it up. The air with entrained, broken paper may be supplied either to a dry system, typically including a separator to separate the paper from the air, or to a wet system for pulping the paper. A trim receiver is one example of a dry system separator. A Venturi scrubber is one example of a wet system. In either case, the paper from the parent roll can be recycled without needing to cut the paper from the roll.

17 Claims, 5 Drawing Sheets

(56) References Cited

U.S. PATENT DOCUMENTS

| | | | |
|---|---|---|---|
| 4,892,263 A * | 1/1990 | Beisswanger | B65H 19/126 |
| | | | 156/508 |
| 5,197,679 A | 3/1993 | Burner et al. | |
| 5,785,814 A * | 7/1998 | Tang | D21F 7/04 |
| | | | 162/189 |
| 6,358,367 B1 * | 3/2002 | Doelle | B26D 7/18 |
| | | | 162/189 |
| 7,717,147 B2 | 5/2010 | Milton | |
| 8,376,259 B2 | 2/2013 | Pienta et al. | |
| 8,584,566 B2 | 11/2013 | Pienta et al. | |
| 8,986,505 B2 | 3/2015 | Oguchi et al. | |
| 9,725,852 B1 * | 8/2017 | Kelyman | D21F 7/00 |
| 10,023,996 B1 | 7/2018 | Kelyman et al. | |
| 10,265,741 B1 * | 4/2019 | Kelyman | D21G 9/00 |
| 2003/0015610 A1 * | 1/2003 | Mannes | D21B 1/32 |
| | | | 241/21 |
| 2003/0113457 A1 * | 6/2003 | Seymour | D21F 11/00 |
| | | | 427/361 |
| 2003/0189069 A1 * | 10/2003 | Wilson | B65H 29/12 |
| | | | 223/37 |
| 2004/0065422 A1 | 4/2004 | Hu et al. | |
| 2009/0078387 A1 * | 3/2009 | Van Winkle | B26D 3/001 |
| | | | 162/272 |
| 2014/0070044 A1 | 3/2014 | Repp et al. | |
| 2015/0292155 A1 | 10/2015 | Bomstad et al. | |
| 2017/0095829 A1 | 4/2017 | Hajakian | |

OTHER PUBLICATIONS

International Search Report issued in International Patent Application No. PCT/US2019/032149 dated Aug. 12, 2019.

Written Opinion issued in International Patent Application No. PCT/US2019/032149 dated Aug. 12, 2019.

* cited by examiner

PNEUMATIC CORE CLEANING SYSTEM

CROSS-REFERENCE TO RELATED APPLICATIONS

This application claims priority to U.S. Provisional Patent Application No. 62/673,813, filed May 18, 2018. That application is incorporated by reference herein in its entirety.

TECHNICAL FIELD

The invention relates generally to field of papermaking, and more specifically to apparatus and methods for preparing rejected paper or tissue on parent rolls for recycling.

BACKGROUND

Modern industrial tissue-making machines operate at very high speed—up to 2,000 meters per minute. The basic layout of the "dry" side of a tissue-making machine is shown in U.S. Pat. No. 9,725,852, the contents of which are incorporated by reference in their entirety. The product of the initial stages of tissue-making is a so-called parent roll, a single-ply roll of tissue that can be quite large—1.3 to 2.7 meters (4.3 to 8.9 feet) in length and up to 3 meters (9.8 feet) in diameter.

Parent rolls are an intermediate product. Typically, they are subjected to further processing operations to produce a finished tissue or paper product. For example, a converting operation or a combining rewinder may be used to produce 2- or 3-ply tissue.

Occasionally, a finished parent roll may not meet quality standards, in which case the paper on it is reprocessed and recycled. The first step in this reprocessing of rejected parent rolls is removing the tissue from the roll, a process called slabing, so that the roll's core can be re-used. In the slabing process, a knife, water jet slitter, or other such tool is used to split the parent roll lengthwise, so that the slabs of tissue can be transferred to a hydro pulper for conversion into a set slurry pulp and sent back through the formation process. This process is laborious and, because of the heavy manual labor and the tools used, it can be dangerous. Muscle strains and cuts are quite common.

Similar issues arise when combining and converting re-winders are used. Parent rolls are sent to these winders and their internal cores are used to mount them on a winding stand. Once the paper or tissue on the parent roll is converted into a commercial product, some residue remains and must be removed from the core so that the core can be re-used. The same manual techniques and tools are used as earlier in the process, raising the same risks of injury.

BRIEF SUMMARY

One aspect of the invention relates to a powered pneumatic system for drawing a sheet off of a parent roll in order to re-use the core of the roll and recycle the paper on the roll. The parent roll is supported on a powered unwind stand, such as a back stand, that turns the roll to unwind it. As the roll unwinds, the unwound sheet is drawn into the inlet of a wide pneumatic hood. The inlet of the hood would be about the same width as the roll itself, and may be dimensioned to maintain a relatively constant pressure across its width. Suction pressure supplied to the hood by a material-handling fan draws the sheet through a duct. The material-handling fan may be particularly adapted to break the unwound sheet into smaller pieces as it passes through the fan.

Beyond the material-handling fan, an apparatus according to this aspect of the invention uses a wet system for handling the airstream with entrained paper. A Venturi scrubber is one example of a wet system, and may be connected to the material-handling fan to receive the paper after it passes through the fan. The Venturi scrubber is equipped with a series of pressure nozzles that force water under high pressure into the fibers to start the conversion of the sheet into a wet slurry of material. The resulting wet slurry from the scrubber may be returned to an earlier stage in the papermaking process for recycling into a useable tissue product.

Another aspect of the invention relates to a powered pneumatic system for drawing a sheet off of a parent roll in order to re-use the core of the roll and recycle the paper on the roll. The parent roll is supported on a powered unwind stand, such as a back stand, that turns the roll to unwind it. As the roll unwinds, the unwound sheet is drawn into the inlet of a wide pneumatic hood. The inlet of the hood would be about the same width as the roll itself, and may be dimensioned to maintain a relatively constant pressure across its width. Suction pressure supplied to the hood by a material-handling fan draws the sheet through a duct. The material-handling fan may be particularly adapted to break the unwound sheet into smaller pieces as it passes through the fan.

Beyond the material-handling fan, an apparatus according to this aspect of the invention uses a dry system for handling the airstream with entrained paper. In this embodiment, a separator, such as a trim receiver, receives the airstream with entrained paper and separates the paper from the airstream. The resulting airstream may be sent through a dust filter before being exhausted.

Apparatus according to some embodiments of the invention may use combinations of wet and dry systems to deal with the paper recovered from the parent roll.

Other aspects, features, and advantages of the invention will be set forth in the description that follows.

BRIEF DESCRIPTION OF THE DRAWING FIGURES

The invention will be described with respect to the following drawing figures, in which like numerals represent like figures throughout the drawings, and in which.

DETAILED DESCRIPTION

Figure 1:
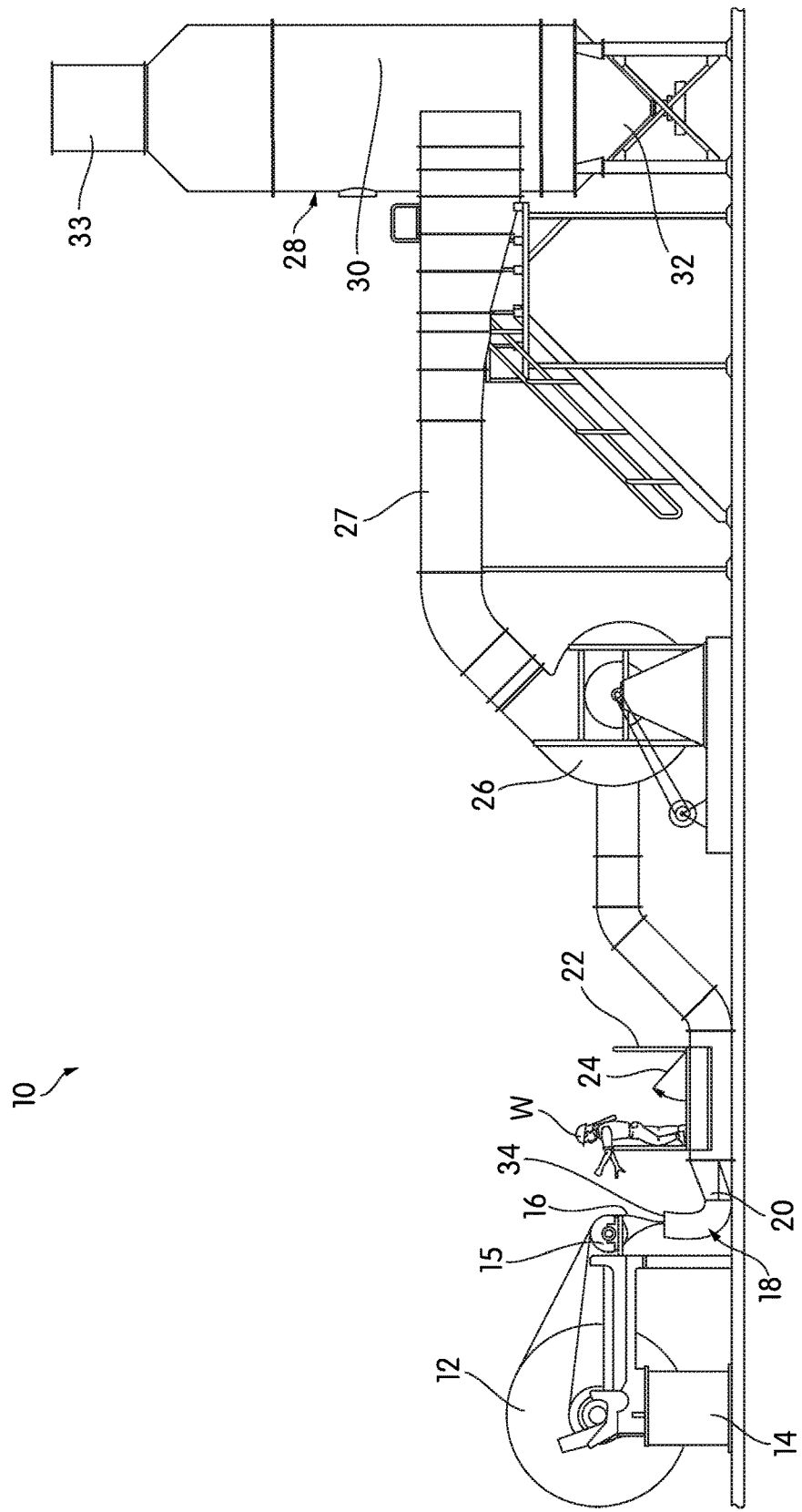
FIG. 1 is a schematic side elevational view of an apparatus for removing paper from the core of a parent roll and recycling the paper that is removed using a wet system.
Figure 2:
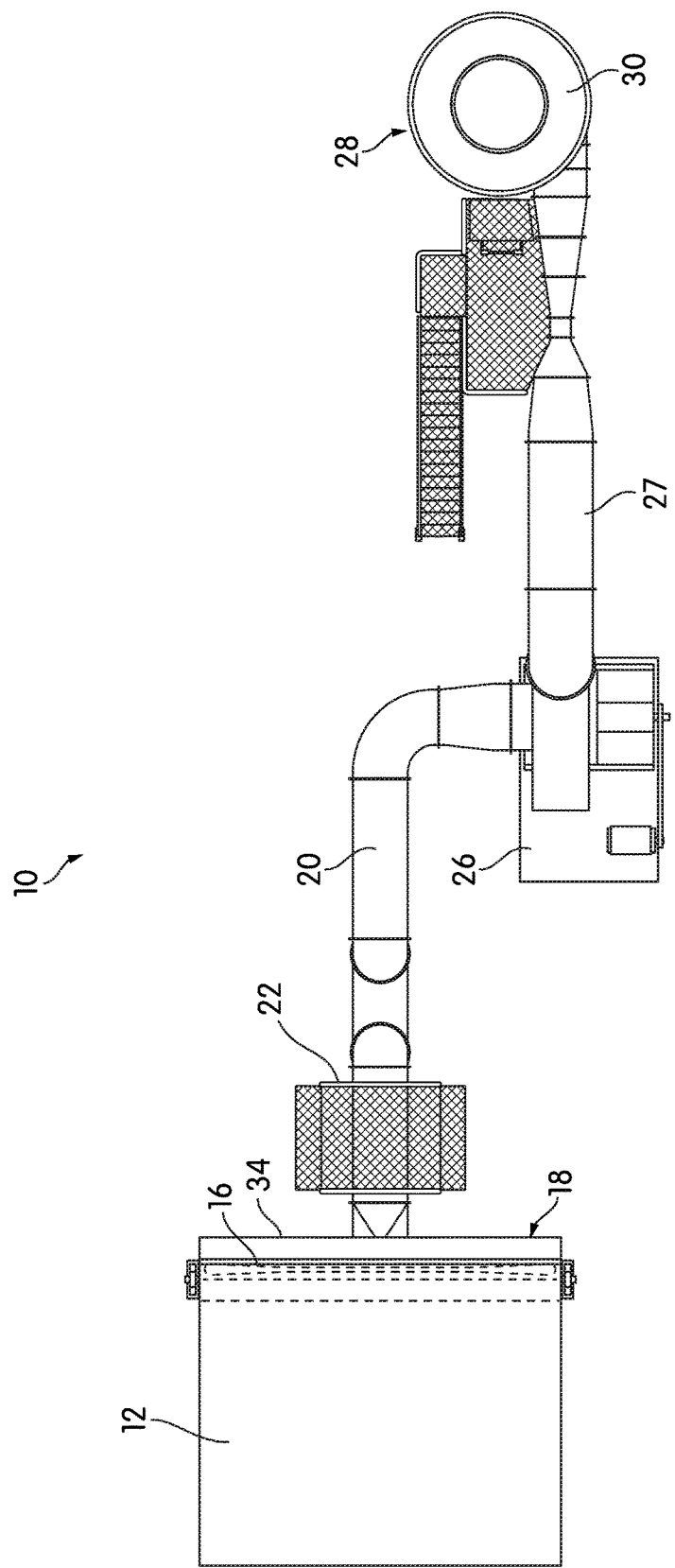
FIG. 2 is a top plan view of the apparatus of FIG. 1.

FIG. 1 is a schematic diagram of an apparatus, generally indicated at 10, for removing unwanted tissue or paper from a parent roll, and FIG. 2 is a top plan view of the apparatus 10. In the apparatus 10, a parent roll 12 is mounted on a powered unwind stand, such as a back stand 14. The back stand 14 is powered by a motor and drives the parent roll in an unwinding direction. The motor may be, e.g., a 20 HP motor, and a power transmission may be provided to transmit power from the motor to the stand 14. The motor may also be driven by a variable speed drive. The unwinding sheet 16 of tissue or paper hangs down from the stand 14 over an idler/guide roll 15 and is captured by a pneumatic hood 18.

The pneumatic hood 18 provides a constant pneumatic suction pressure across the width of the parent roll 12 that draws the sheet 16 down and into the hood 18. The hood 18 itself is connected to an appropriate duct 20 which may, for example, be constructed of galvanized steel. As can be seen in FIGS. 1 and 2, the duct 20 is positioned along floor level. A crossover walkway 22 is positioned just above the duct 20 to allow a worker W to get close to the back stand 14, observe the process, and intervene if necessary without disturbing the duct 20. The duct 20 has an access hatch 24 that is accessible from the walkway 22 in order to clear jams and otherwise clean out the duct 20.

Of course, the positioning of the duct 20 may vary somewhat from implementation to implementation. While the duct 20 extends along the floor in the illustrated embodiment, in some cases, a recessed channel may be formed in the floor and the duct 20 placed in that channel. However, the process of forming such a channel may be laborious, expensive, or both.

The airflow is provided by a material-handling fan 26 in fluid communication with the duct 20. For ease of illustration, the fan inlet is shown as a 90° feed to the fan, but the inlet could be a direct inlet feed without a change in direction. Depending on the width of the sheet 16, the material handing fan 26 may provide an airflow rate of at least 14,000 cubic feet per minute (396.4 m$^3$/min) for a 2.3 meter-wide machine and 28,000 cubic feet per minute (792.9 m$^3$/min) for a 5.4 meter-wide machine in order to drive the process. The material-handling fan 26 may be driven by a variable frequency drive (i.e., a variable speed drive), so that the airflow can be adjusted if needed. The transport velocity within the duct 20 may be at least about 6,000 feet per minute (1829 m/min). In addition to providing an appropriate airflow to move the scrap paper through the system, the material-handling fan 26 performs another function as well: it chops the incoming sheet into small pieces.

Figure 3:
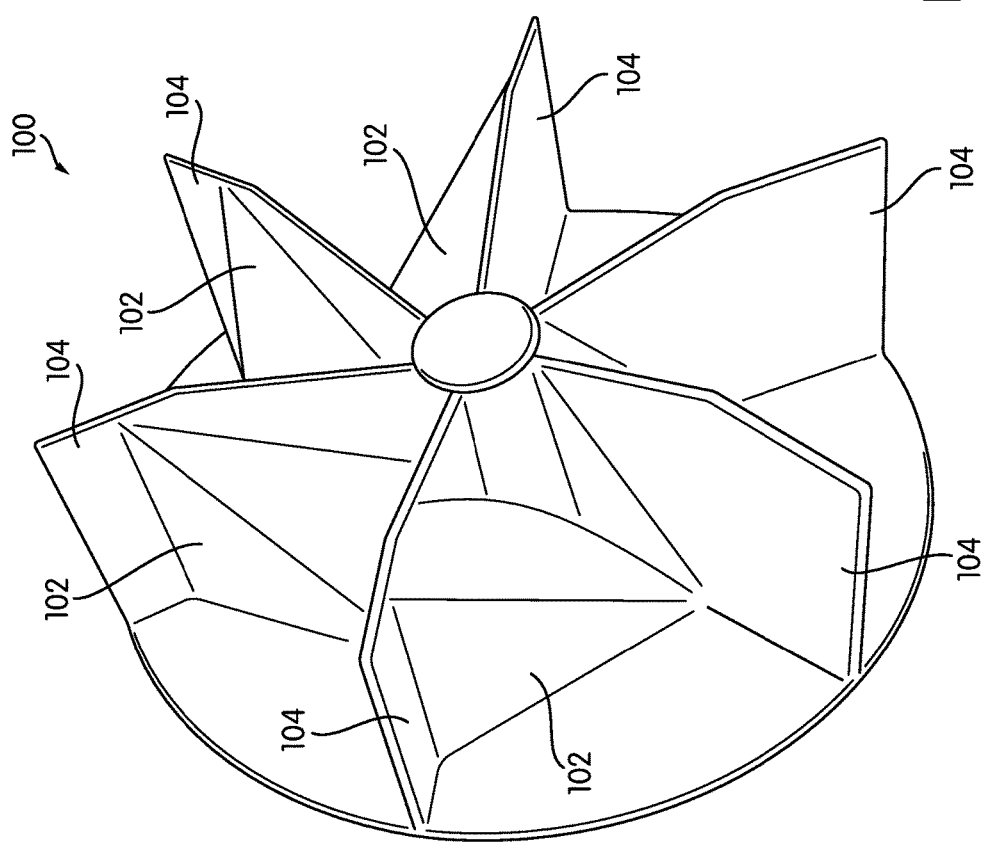
FIG. 3 is a perspective view of the wheel of the material-handling fan of the apparatus of FIG. 1.

FIG. 3 is a perspective view of the wheel 100 of the material-handling fan 26. As shown, the wheel 100 has trapezoidal gussets 102 supporting its blades 104. The wheel 100 may be, for example an RBP Industrial Radial Paper Handling Wheel by Twin City Fan & Blower of Minneapolis, Minnesota, USA. In addition to the wheel 100 itself, the casing and inlet of the material-handling fan 26 may be particularly adapted to facilitate the flow of paper into the fan 26.

Apparatus according to embodiments of the invention may use either a wet system, a dry system, or some combination of wet and try systems to process and recycle the paper captured by the hood 18. With respect to FIGS. 1 and 2, beyond the material-handling fan 26 lies a Venturi scrubber 28, which is one example of a wet system. Air with entrained, broken paper travels through a second length of duct 27 to the Venturi scrubber 28. The Venturi scrubber 28 is equipped with a series of pressure nozzles that force water under high pressure into the fibers to start the conversion of the sheet into a wet slurry of material. In a typical embodiment, the Venturi scrubber 28 would bombard the broken paper with a minimum of 8 gallons (30.2 l) of process water per 1000 cubic feet (28.3 m$^3$) of airflow for bath tissue and a minimum of 11 gallons (41.6 l) of process water per 1000 cubic feet of airflow for towel. For heavy, wet-strength towel, hot water at about 130° F. (54° C.), would be used to assist in the rapid breakdown of the towel.

After the Venturi scrubber 28, the wet material and process water are discharged into a scrubber tank 30. The scrubber tank 30 has two functions. First, the drain of the scrubber tank is equipped with a barometric leg or other such device that provides a residence time, so that the material soaks until it is fully converted to a wet slurry. Second, the large volume of water in the tank 30 serves as a hydraulic head that provides the force necessary to transport the slurry to a discharge point without a pump. In some cases, when high wet strength is a component in the reject roll tissue, a trash pump at the scrubber discharge may be used to insure the conversion of tissues pieces are reduced in size to avoid any potential for plugging of downstream materials. A conical base 32 helps to ensure that material does not stagnate in the tank 30, and reduces the need for equipment cleaning. The top of the tank 30 provides a separation area for air and liquid, and the process air developed by the material-handling fan 26 is exhausted out the stack 33. If the humid air is an issue, a mist eliminator may be installed in some embodiments.

Figure 4:
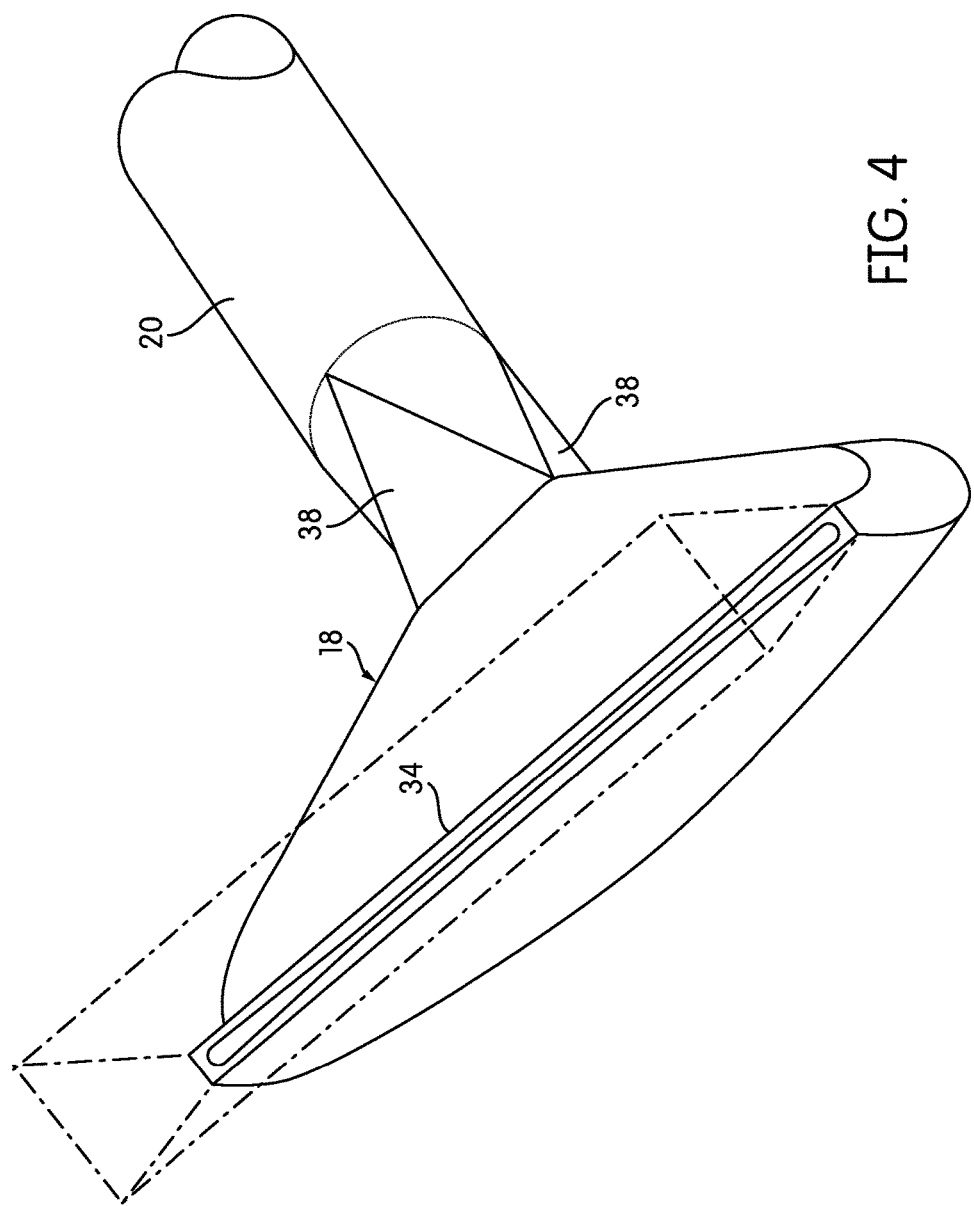
FIG. 4 is a perspective view of the inlet of the apparatus of FIG. 1.

FIG. 4 is a perspective view of the hood 18. As shown in FIGS. 1, 2, and 4, the duct 20 extends generally horizontally in the area proximate to the stand 14 and, as noted above, would generally extend along floor level. The hood 18 itself is a generally J-shaped extension of the duct 20 in this embodiment; the duct 20 narrows somewhat and makes a 90° turn, so that the inlet 34 produces a vertical airflow that draws the sheet 16 down and into the hood 18. The portion of the duct 20 that connects it with the hood 18 has a number of flat facets 38 that help in the transition from a rectangular cross-sectional shape to a round one and adapt it to connect with the hood 18.

In the apparatus 10, the hood 18 and its inlet 34 are designed to keep a relatively constant air flow rate and relatively constant pressure across the entire width of the inlet 34—which may be several meters—in order to keep the sheet 16 moving easily into the inlet 34. In a typical embodiment, the inlet 34 would be, e.g., about 3 inches (7.6 cm) in height at the center. Because the duct 20 is connected to the hood 18 substantially in the center of the hood 18 and the airflow would thus typically be greater in the center than at the sides, the inlet 34 and may have a greater height at the sides than at the center to maintain constant pressure, creating a "bow tie" shape. For example, the inlet 34 may have a height at the sides of about 6 inches (15.2 cm). FIG. 4 exaggerates the aspect ratio of this bow tie shape in order to illustrate it. The actual aspect ratio may be from about 1:1.5 to about 1:2.0.

The shape of the inlet 34 will depend, at least in part, on where the duct 20 joins the hood 18. The "bow tie" shape of FIG. 4 is particularly well-suited for situations in which the duct 20 joins the hood 18 on center or substantially on center. If the duct 20 joins the hood 18 at either end, other arrangements may be necessary. For example, U.S. Pat. No. 10,023,996, the contents of which are incorporated by reference in their entirety, discloses hood body and inlet shapes that are adapted to maintain even pressure across an inlet, and the teachings of that patent may be applied here. However, as those of skill in the art will realize, while it may be helpful to maintain roughly even pressure across the inlet 34, it is not as necessary in this application, because it is actually desirable that the paper being removed from the parent roll 12 is broken up into small pieces, as uneven pressures are likely to do.

Figure 5:
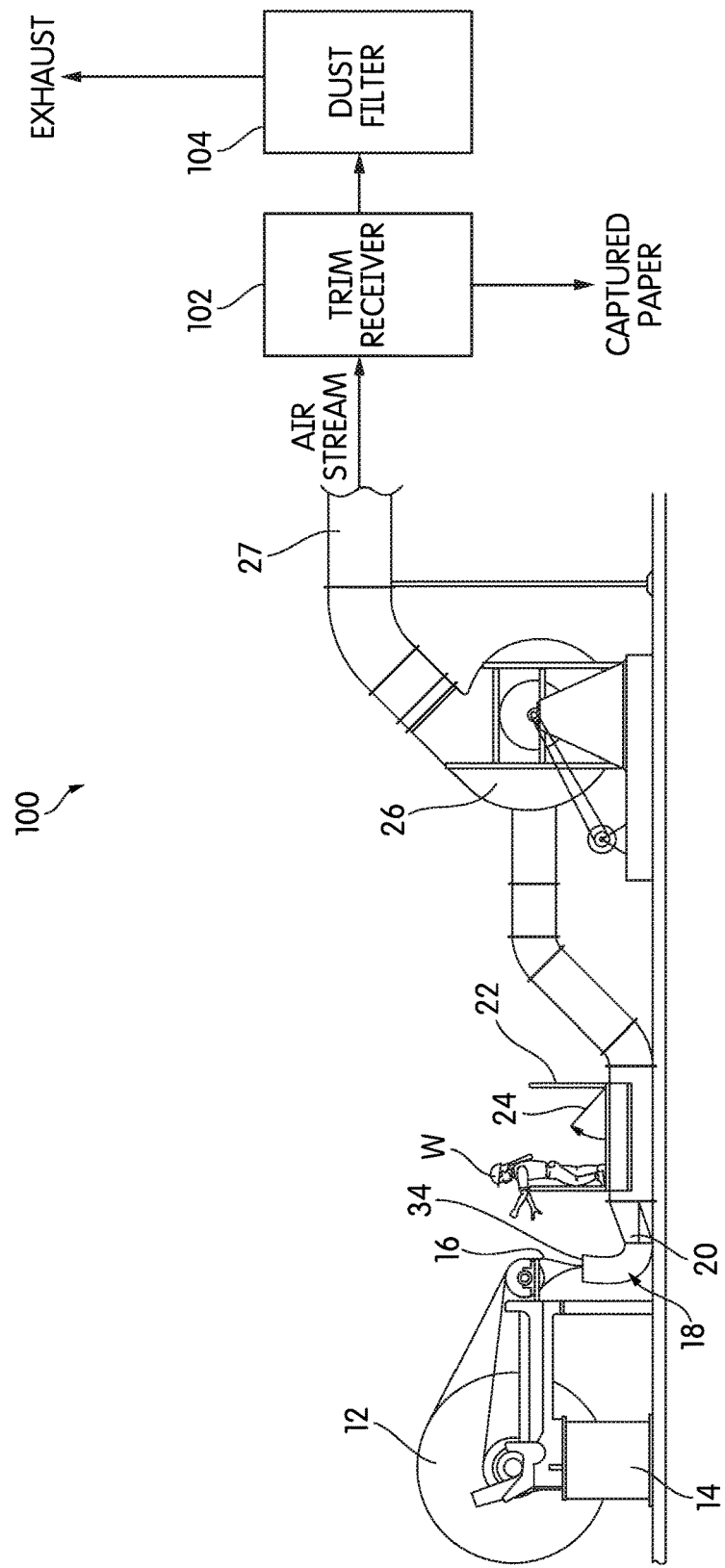
FIG. 5 is a schematic illustration of an apparatus according to another embodiment of the invention that uses a dry system for processing the paper from the parent roll.

As those of skill in the art will note, the apparatus 10 uses a "wet recycling" process in which a Venturi scrubber 28 is used to make the rejected paper into a wet slurry for recycling. However, in some applications, capturing the rejected paper in dry form may be preferred. FIG. 5 is a partially schematic view of an apparatus, generally indicated at 100, according to another embodiment of the invention. The inlet side of the apparatus 100 is essentially the same as the inlet side of the apparatus 10; therefore, the description above will suffice for those components.

After the material-handling fan 26, the air with entrained, chopped paper is sent to a trim receiver 102. A trim receiver 102 is essentially a separator that allows the entrained paper to separate from the airstream. This element is sometimes referred to as a screever. The airflow with entrained, chopped paper enters at the top of a tank. An inverted conical screen within the tank allows air with dust to pass through, but traps larger pieces of paper. Those larger pieces of paper are discharged through the bottom of the tank by gravity, and the separated, discharged paper may be baled or otherwise collected from the discharge of the trim receiver 102 for some form of reuse or recycling. Although one particular apparatus is described here, any mechanism that can separate the paper from entrained air may be used.

The airstream that flows out of the trim receiver usually includes at least some entrained dust. Thus, the airstream is sent from the trim receiver to a dust filter 104. The dust filter 104 may be a solid dust filter with a traditional filter medium, or it may be a wet filter. For example, a Venturi scrubber similar to the Venturi scrubber 28 may be used to turn the entrained dust into a wet slurry for recycling.

Whether a wet recycling apparatus 10 or a dry recycling apparatus 100 is used will depend on the application and the preferences of the manufacturer. One advantage is that the pneumatic capture system can be used with either type of recycling system. Of course, the choices are not limited to only a dry system or only a wet system. Instead, in some embodiments, the separated paper may be sent from the trim receiver 102 to a hydro pulper for creation of a wet slurry, and that wet slurry may be recycled into an earlier stage of the papermaking process.

Some portions of this description refer to various ranges and values by using the word "about." As used here, that term should be construed to mean that the actual ranges and values may vary from what is stated so long as the function or result is unaffected. If it cannot be determined what ranges or values will alter the function or result, "about" should be interpreted to mean ±5% relative to the stated range or value.

Additionally, certain portions of this description refer to tissue, while other portions refer to paper. For purposes of this application, the terms "tissue" and "paper" should be considered to be essentially synonymous. As those of skill in the art will understand, the present apparatus and processes can be used with any form of paper product.

While the invention has been described with respect to certain embodiments, the description is intended to be exemplary, rather than limiting. Modifications and changes may be made within the scope of the present invention, which is defined by the appended claims.

What is claimed is:

1. An apparatus, comprising:
   a powered stand arranged to drive a roll of paper in an unwinding direction;
   a hood disposed below the powered stand, the hood having an inlet sized and arranged to accept an unwound sheet from the roll;
   a material-handling fan in communication with the hood through a duct, the material-handling fan providing sufficient airflow to move the sheet from the hood and through the duct; and
   a wet system in fluid communication with the material-handling fan to receive the sheet from the material-handling fan and convert it to a wet slurry of material for recycling.

2. The apparatus of claim 1, wherein the material-handling fan is adapted to break the sheet into pieces as it moves through the fan.

3. The apparatus of claim 1, wherein the duct extends along a floor.

4. The apparatus of claim 3, wherein the hood is connected to the duct and makes an upward turn such that the hood is oriented substantially vertically under the stand.

5. The apparatus of claim 4, wherein the duct connects to the hood in a position at least substantially aligned with a width-wise center of the inlet.

6. The apparatus of claim 5, wherein the inlet of the hood is at least substantially the same size as a width of the roll of paper or tissue.

7. The apparatus of claim 5, wherein the inlet is narrower at its width-wise center than at its sides.

8. The apparatus of claim 1, wherein a transport velocity within the duct is at least about 6,000 feet per second.

9. The apparatus of claim 1, further comprising a cross-over walkway positioned over the duct proximate to the hood.

10. The apparatus of claim 1, wherein the material-handling fan is adapted to break the unwound sheet into pieces as it passes through the fan.

11. The apparatus of claim 10, wherein the material-handling fan has a wheel with a plurality of blades and a corresponding plurality of supporting gussets between blades.

12. The apparatus of claim 1, wherein the powered stand has a variable speed drive.

13. The apparatus of claim 1, wherein the material-handling fan has a variable speed drive.

14. The apparatus of claim 1, wherein the wet system is a Venturi scrubber.

15. An apparatus, comprising:
    a powered stand arranged to drive a roll of paper in an unwinding direction;
    a hood disposed below the powered stand, the hood having an inlet sized and arranged to accept an unwound sheet from the roll; and
    a material-handling fan in communication with the hood through a duct, the material-handling fan providing sufficient airflow to move the sheet from the hood and through the duct, and breaking the unwound sheet into pieces as the unwound sheet passes through the fan.

16. The apparatus of claim 15, further comprising a dry system in fluid communication with the material-handling fan, the dry system including
    a separator that separates the pieces of paper from the airflow; and
    a filter that receives exhaust air from the separator and removes dust.

17. The apparatus of claim 15, further comprising a wet system in fluid communication with the material-handling fan, the wet system turning the pieces of paper into a wet slurry for recycling.

* * * * *